United States Patent
Macrae et al.

(10) Patent No.: US 9,808,054 B2
(45) Date of Patent: Nov. 7, 2017

(54) WEARABLE ELECTRONIC APPARATUS PROVIDING SENSORY FEEDBACK

(71) Applicants: Andrew Donald Macrae, San Francisco, CA (US); Phyllis Koton Neel, Toronto (CA)

(72) Inventors: Andrew Donald Macrae, San Francisco, CA (US); Phyllis Koton Neel, Toronto (CA)

(73) Assignee: Linkitz Systems Inc., Dover, DE (US)

( * ) Notice: Subject to any disclaimer, the term of this patent is extended or adjusted under 35 U.S.C. 154(b) by 61 days.

(21) Appl. No.: 14/883,696

(22) Filed: Oct. 15, 2015

(65) Prior Publication Data

US 2016/0095395 A1 Apr. 7, 2016

Related U.S. Application Data

(63) Continuation of application No. PCT/CA2014/050383, filed on Apr. 16, 2014.
(Continued)

(51) Int. Cl.
| | |
|---|---|
| *G08B 6/00* | (2006.01) |
| *A44C 15/00* | (2006.01) |
| *H04B 10/114* | (2013.01) |
| *H04B 10/116* | (2013.01) |
| *G08B 3/10* | (2006.01) |

(Continued)

(52) U.S. Cl.
CPC .............. *A44C 15/005* (2013.01); *G08B 3/10* (2013.01); *G08B 5/22* (2013.01); *G08B 6/00* (2013.01); *H04B 5/0037* (2013.01); *H04B 10/116* (2013.01); *H04B 10/1143* (2013.01); *H04B 5/0031* (2013.01); *H04B 5/0081* (2013.01)

(58) Field of Classification Search
CPC ....... G08B 6/00; A44C 15/00; A44C 15/0035; A44C 15/003; A63B 2071/0655; A63B 2071/0663; A63B 2071/0666
USPC ..... 340/407.1, 531, 815.4, 815.45; 455/41.1, 455/41.2; 63/1.11; 710/110
See application file for complete search history.

(56) References Cited

U.S. PATENT DOCUMENTS

2005/0216631 A1* 9/2005 Daly ................... G06F 13/4256
710/110
2007/0279852 A1 6/2007 Daniel et al.
(Continued)

FOREIGN PATENT DOCUMENTS

KR 20020048340 6/2002

OTHER PUBLICATIONS

Labrune et al., "Telebeads: Social Network Mnemonics for Teenagers", IDC '06, Jun. 7-9, 2006, Tampere, Finland.
(Continued)

*Primary Examiner* — Hung T Nguyen
(74) *Attorney, Agent, or Firm* — Verrill Dana, LLP; John W. Powell

(57) ABSTRACT

Wearable electronic apparatus providing sensory feedback is provided. The wearable electronic apparatus has master beads that can power slave beads. The beads have electronic circuitry enabling visual, auditory or haptic feedback to be initiated by the master beads. Master beads of one unit of a wearable electronic apparatus communicate with master beads of another unit of another apparatus. In the presence or proximity of an authorized apparatus, the master bead causes the slave beads to provide a user with sensory feedback.

18 Claims, 8 Drawing Sheets

Related U.S. Application Data

(60) Provisional application No. 61/812,926, filed on Apr. 17, 2013.

(51) Int. Cl.
    *G08B 5/22*     (2006.01)
    *H04B 5/00*     (2006.01)

(56) References Cited

U.S. PATENT DOCUMENTS

| | | | | |
|---|---|---|---|---|
| 2007/0217209 | A1* | 9/2007 | Wong | H05B 37/029 |
| | | | | 362/418 |
| 2009/0153350 | A1* | 6/2009 | Steger | A63B 71/0686 |
| | | | | 340/4.2 |
| 2010/0264056 | A1* | 10/2010 | Braunstein | A44C 11/002 |
| | | | | 206/575 |
| 2011/0059696 | A1* | 3/2011 | Rasmussen | H04R 25/552 |
| | | | | 455/41.1 |
| 2011/0289176 | A1* | 11/2011 | Toyama | H04L 12/24 |
| | | | | 709/211 |
| 2013/0055758 | A1* | 3/2013 | Carter | A44C 15/0035 |
| | | | | 63/1.11 |
| 2014/0218184 | A1* | 8/2014 | Grant | G08B 6/00 |
| | | | | 340/407.1 |

OTHER PUBLICATIONS

Javier et al., "Techniques for Interacting with Small Devices", UBICOM 2012, The 6th international conference on mobile ubiquitous computing, systems, services and technologies, p. 129-132, SBN: 978-1-612-8-263-3.

Merrill et al., "Siftables: towards sensor network user interfaces", Proceedings TEI'07, 2007.

Werner et al., "United-pulse: feeling your partner's pulse", MobileHCI 2008, Sep. 2-5, 2008, Amsterdam, Neatherlands.

International Search Report with Written Opinion, dated Nov. 7, 2014, received in international patent application No. PCT/CA2014/050383, 10 pages.

\* cited by examiner

WEARABLE ELECTRONIC APPARATUS PROVIDING SENSORY FEEDBACK

CROSS REFERENCE TO RELATED APPLICATIONS

This application is the US National Stage of International Application No. PCT/CA2014/050383, filed on Apr. 16, 2014, which claims priority to U.S. Provisional Patent Application No. 61/812,926 filed on Apr. 17, 2013. The content of all of which is incorporated herein by reference.

TECHNICAL FIELD

The following relates generally to a wearable electronic apparatus that provides sensory feedback.

BACKGROUND

Wearable electronics are becoming more common as portable processing capabilities increase. Many wearable electronic devices are dedicated to a particular purpose, such as providing a pedometer, smartphone interface, etc.

Very few such devices are flexible in their functions and very few such devices permit interaction between social contacts. Further still, those that do permit social interaction typically rely on a smartphone device to do so.

SUMMARY

In one aspect, there is provided a wearable electronics apparatus comprising: a plurality of beads, at least one of the beads being operable to communicate with and power at least another one of the beads. In other aspects, at least one of the beads is operable to communicate with the at least one bead on another wearable electronic apparatus.

In another aspect, there is provided a wearable electronic apparatus, comprising: at least one master bead and at least one slave bead disposed along an electrically conductive medium, the at least one master bead operable to communicate with and power by conduction through the electrically conductive medium the at least one slave beads to cause the slave beads to perform at least one sensory feedback function, or collect sensor data. In further aspects, the at least one master bead is operable to communicate with the at least one master bead of another wearable electronic apparatus.

In another aspect, a kit for a wearable electronic apparatus is provided, the kit comprising a magnetically permeable medium, at least one master bead and at least one slave bead, the at least one master bead and at least one slave bead disposable along a medium, wherein when the at least one slave bead and the at least one master bead are disposed along the medium, the at least one master bead being operable to communicate with and power by induction the at least one slave bead to cause the at least one slave bead to perform at least one sensory feedback function. In a still further aspect, the at least one master bead is further operable to communicate with the at least one other master bead on another wearable electronic apparatus.

In a still further aspect, there is provided a wearable electronic apparatus comprising: a plurality of beads, each bead having a conductive male connector and a conductive female connector; the female connector of one bead being configured to receive therein the male connector of another bead; and wherein at least one of the beads is operable to communicate with and power by electrical conduction at least another one of the beads through the connectors therebetween.

In aspects, there is provided a wearable electronic apparatus comprising at least one bead to provide at least one sensory feedback function.

In another aspect, a kit for a wearable electronic apparatus is provided, the kit comprising at least one master bead and at least one slave bead, the at least one master bead and the at least one slave bead being electrically coupled to each other, wherein the at least one master bead is operable to communicate with the least one slave bead in order to cause the at least one slave bead to perform at least one sensory feedback function. In a still further aspect, the at least one master bead is further operable to communicate with at least one master bead of another wearable electronic apparatus.

In a still further aspect, there is provided a wearable electronic apparatus comprising at least one master bead, the at least one master bead operable to perform at least one sensory feedback function. In embodiments, the at least one master bead is further operable to communicate with the at least one master bead of another wearable electronic apparatus.

Various other aspects are provided.

BRIEF DESCRIPTION OF THE DRAWINGS

The features of the invention will become more apparent in the following detailed description in which reference is made to the appended drawings wherein.

DESCRIPTION

Figure 1:
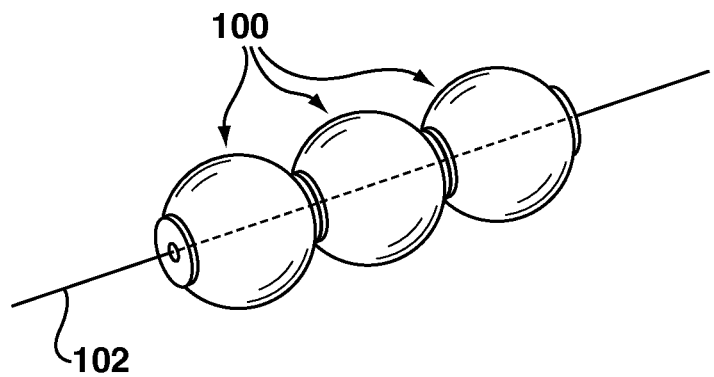
FIG. 1 is a front perspective view of an example jewelry apparatus.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using one or more processors, computer readable media and computer readable/executable instructions that may be stored or otherwise held by such computer readable media and executed by the one or more processors.

The term "jewelry" as used herein refers to any accessory, and need not be one which is decorative and/or wearable. In preferred embodiments, a typical use of the jewelry would be to accompany its owner in daily use. Alternative uses and embodiments would be appreciated by a person of skill in the art.

The jewelry apparatus provided herein comprises one or more units (hereinafter "beads") comprising master beads and slave beads. Each bead comprises circuitry to perform at least one function. It should be understood that the use of the term "bead" is not to be construed as being limited to any particular shape.

The jewelry may be provided as a kit for assembly and modification from time to time. Components of the jewelry can be considered to be modules of a modular jewelry apparatus.

One or more master beads may be physically and electrically coupled to one or more slave beads to provide a unitary jewelry apparatus. Master beads are operable to provide current to slave beads, to electrically power the slave beads, and may further provide control signals to slave beads. Slave beads are configured to perform a function in response to one or more particular control signal. The master beads may be configured to communicate with slave beads of the same jewelry apparatus (also referred to herein as "intra jewelry control") and with master beads of another jewelry apparatus (also referred to herein as "inter jewelry control").

Referring first to FIG. 1, the physical construction of a jewelry apparatus may generally comprise a plurality of beads (100) linked to one another directly and/or along a common medium (102). In embodiments comprising a common medium (102), it may, for example, be a rigid or flexible string, rope, thread, braid, wire, chain, etc. The medium may be looped (not shown), such that the last placed bead is caused to abut the first placed bead, to provide a jewelry apparatus, such as, for example, a bracelet, necklace, anklet or ring. Preferably, the loop may be detached from time to time to enable an individual to add, remove or reorder beads. Other jewelry may be provided without looping the medium (as shown) including, for example, a brooch, earrings, headpiece, etc. In embodiments, the medium is electrically conductive.

Figure 2:
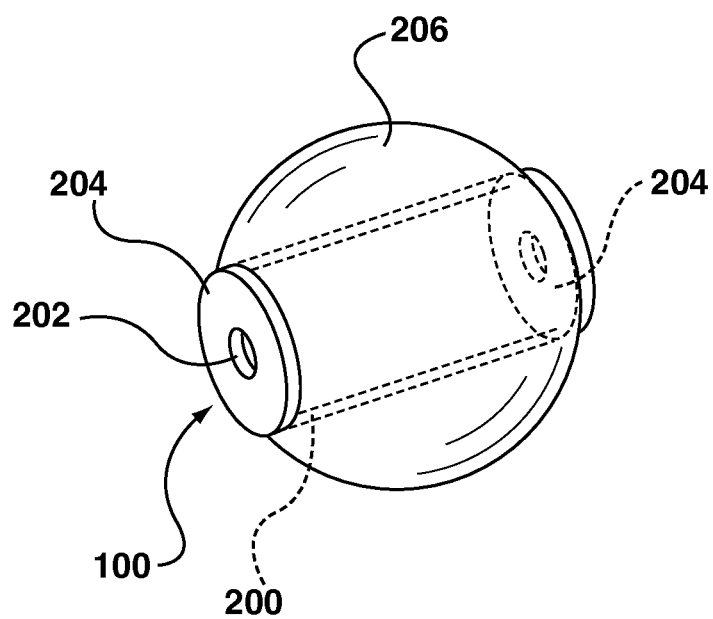
FIG. 2 is a perspective view of the housing of an example bead.

A single bead (100) suitable for the apparatus of FIG. 1 is shown in FIG. 2. The bead (100) shown in this embodiment comprises a generally cylindrical housing (200) with a continuous aperture (202) disposed therethrough along the central axis of the housing (200). The housing (200) may be coated with a generally transparent or translucent coating, such as a resin (206). The resin (206) may be coloured or tinted as desired.

In the embodiment shown, the aperture (202) accommodates the medium (102). The aperture may be lined with an electrically conductive material. At each end of the housing surrounding the aperture and electrically isolated therefrom is an electrically conductive contact (204) enabling electrical conductivity to an adjacently placed and potentially abutting bead. Within the bead is circuitry enabling the bead to perform at least one function.

In another embodiment, each bead comprises electrical components sufficient to provide the functionality otherwise provided by the medium. In the example shown in FIG. 6, a single bead (600) is shown. The bead (600) comprises an annular housing (601). It will be appreciated that the housing (601) may take other suitable forms. The housing (601) may be coated with a generally transparent or translucent coating, such as, for example, a resin. The resin may be coloured or tinted as desired. The annulus (609) defined by the annular housing may be filled in by material such that the annular housing (601) appears generally circular or ovular. Preferably, the material is the same resin as used for the housing, enabling the housing and annulus to be integrally formed.

The bead (600) comprises circuitry (not visible, described below in greater detail) enabling the bead (600) to perform at least one function. As shown, the circuitry may be disposed within the annular housing (601). However, in further embodiments, the circuitry may be disposed elsewhere on or within the bead (600).

Figure 6A:
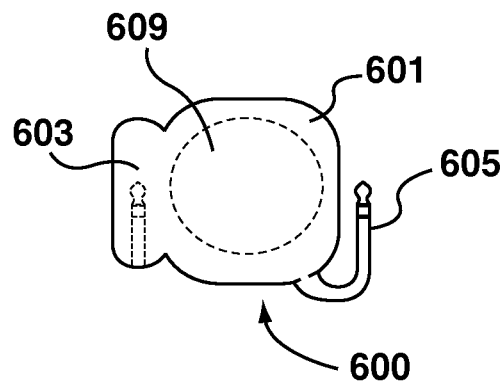
FIG. 6A is a front view of another example bead.
Figure 6B:
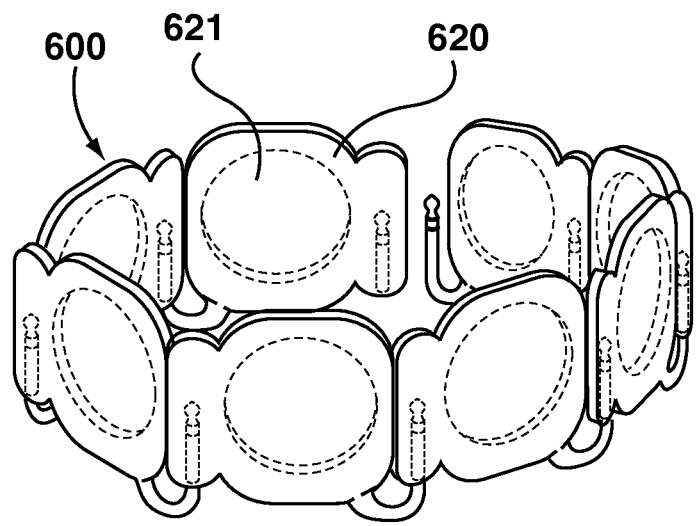
FIG. 6B is a top perspective view of another example jewelry apparatus.

The bead (600) further comprises a conductive male connector (605) and a conductive female connector (603) disposed on opposing ends of the bead. The male connector (605) is configured to receive therein the female connector (603) of an adjacent bead (600). The male connector (605) of one bead (600) is configured to provide signal and power conduction to the female connector (603) of another bead (600), as shown in FIG. 6B. Preferably, the male connector (605) on one bead (600) also releasably couples the bead (600) to the female connector (603) of the other bead.

It will be appreciated that the male connector (605) and female connector (603) can be constructed of any conductive material, such as, for example steel or copper. In aspects, however, the male and female connectors (605) and (603) comprise, respectively, a tip/ring/sleeve (TRS) connector providing a serial link and a power supply. The serial link allows a bead to share capabilities like use of an infrared emitter and an infrared receiver with other beads on the chain such that the male connector (605) of one bead (600) forwards an infrared signal to the female connector (603) of another bead (600). The emitter and the receiver may be reversed, such that the female connector (603) of one bead (600) provides an infrared signal to the male connector (605) of another bead (600).

In embodiments, a pivotal coupling of one bead to another bead is effected by providing a male connector having a cylindrical housing for insertion into a mating receptacle of the female connector (603) of an adjacent bead. As shown in FIGS. 6A and 6B, the male connector (605) is shaped as a substantially cylindrical pin, and the female connector (603) defines a correspondingly substantially cylindrical receptacle, such that the insertion of the male connector (605) of one bead (600) into the female connector (603) of another bead (600) provides for a coupling that is pivotal about the coaxial axes of the male connector (605) and the female connector (603). As shown particularly in FIG. 6B, a plurality of beads (600) may thus be joined in series to form a suitable jewelry apparatus comprising a plurality of connected beads, each of which is pivotally coupled to its adjacent beads. It will be appreciated that a user may thereby connect a series of beads so as to encircle the user's wrist or finger, as in a bracelet or ring, respectively.

In still further embodiments, bead (600) may be a "dummy bead" which does not comprise circuitry. Such a dummy bead (600) may provide "pass-through" functionality to conduct electricity or other signalling between other beads having circuitry. In order to provide electrical pass-through functionality, the dummy bead (600) provides a conductive path between the female connector (603) and the male connector (605). The entire bead (600) may be conductive to provide the conductive path, or the bead (600) may comprise an electrically conductive component, such as a wire, electrically coupling the female pin (605) to the male pin (603).

As shown in FIG. 6B, a plurality of beads (600) and (620) are arranged in series. Each bead (600) or (620) is coupled and connected to at least one adjacent bead (600) or (620), as previously described. The series of beads comprises at least one bead (620) comprising a power source (621). The power source (621) may take any suitable form, such as, for example, a battery, a capacitor or a solar cell. In the embodiment depicted in FIG. 6B, the power source (621) is disposed within the annulus of the annular housing (601). In embodiments where the power source (621) is itself has a substantially short cylindrical housing, it can be disposed in coplanar arrangement with the bead (620).

The bead (620), being electrically coupled to the other beads (600), may transmit power to the other beads (600) across the series of male and female connectors (603) and (605) as previously described. Although only one bead (620) comprising a power source (621) is shown in the series of beads (600) and (620), it will be appreciated that multiple beads (620), each comprising a power source (621), can be included in the series. Although the beads are in series, it is contemplated herein that the electrical path provided by the beads can be series or parallel by arranging electrical components within each bead (as described below) suitably.

Figure 7A:
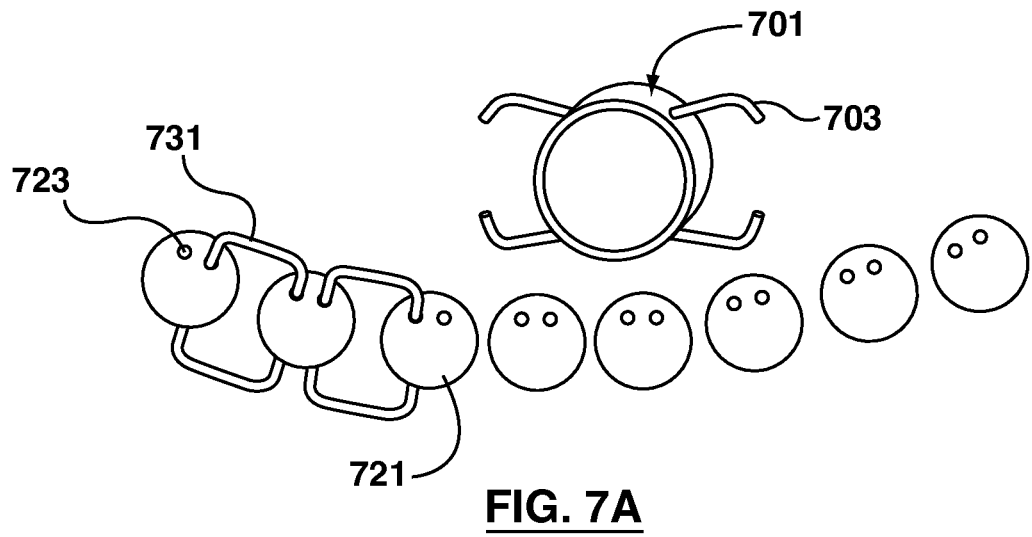
FIG. 7A is a front view of another example jewelry apparatus.
Figure 7B:
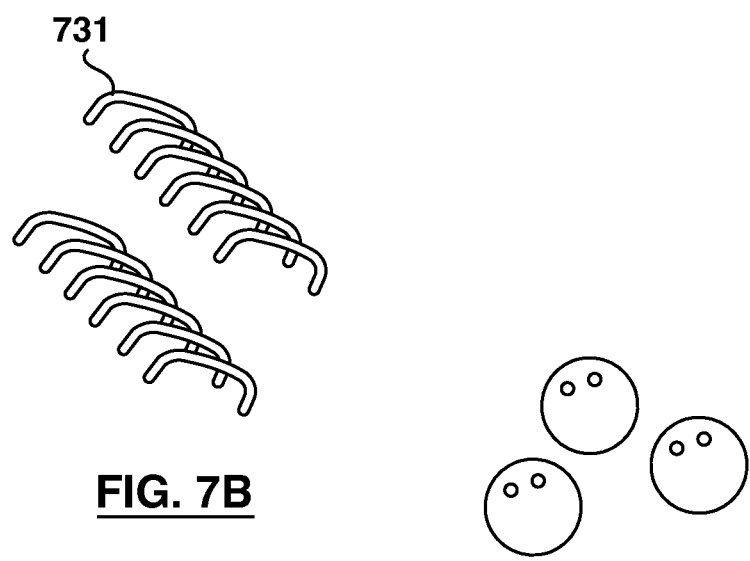
FIG. 7B is a front view of an example connector.
Figure 7C:
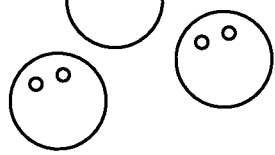
FIG. 7C is a front view of another example bead.

As shown in FIGS. 7A to 7C, still further bead and connector configurations are provided. As shown in FIG. 7A, at least one master bead (701) comprising conductive connectors (703) is provided. At least one slave bead (721) is further provided. The conductive connectors (703) of this embodiment are configured for releasable and pivotal engagement with corresponding receptacles (723) with the slave beads (721). As shown in FIG. 7B, connector pins (731) are provided. Connector pins (731) are constructed from conductive material, such as, for example, copper or steel, and are configured for optionally releasable engagement within the receptacles (723) of the slave beads (721).

A sequence of beads comprising at least one master bead (703) and at least one slave bead (721) can thereby be assembled, as partially shown in FIG. 7A. The conductive connectors (703) of the at least one master bead (701) are engaged within corresponding receptacles (723) of the adjacent slave beads (721). In embodiments, in order to releasably retain the adjacent slave beads (721), the conductive connectors (703) are made from a material that is either spring-like or with memory, such that opposing ends of a pair of connectors (703) can be biased towards each other. Each slave bead (721) may be connected to an adjacent slave bead (721) by at least one connector pin (731). Each connector pin (731) is releasably engageable at either end with the receptacles (723) in the slave beads (721). A connector pin (731) retains and connects to each of a pair of slave beads (721) when the connector pin (731) is engaged at one end by one of the receptacles (723) of a first slave bead (721) and at the other end by one of the receptacles (723) of a second slave bead (721).

In embodiments, the connector pin (731) is substantially U-shaped and tubular. Where the receptacle (723) of a slave bead (721) is cylindrical corresponding to the dimension of the tubular connector pin (731), either prong of the connector pin (731) is coaxially received within the receptacle (723).

It will be appreciated that, when a master bead provides power to a slave bead, the jewelry apparatus depends for its power on the power source contained within each master bead. As the power source becomes diminished, the jewelry apparatus loses functionality. Therefore, in embodiments, a user may swap out at least one master bead having a diminished power source with at least one other master bead having a recharged power source, thereby restoring power and functionality to the jewelry apparatus.

Generally, each bead is a master bead or a slave bead. In embodiments, multiple master beads are electrically coupled to one another directly or via intermediate slave beads and/or dummy beads. In such embodiments, connections permit multi-master communications in which masters may share resources such as, for example, power, feedback devices, sensor data or communications channels. In further embodiments, additional beads may be provided that do not comprise electrical circuitry but that may have linked connectors (204) at each end thereof to pass current through the bead, as previously described in greater detail.

Figure 3:
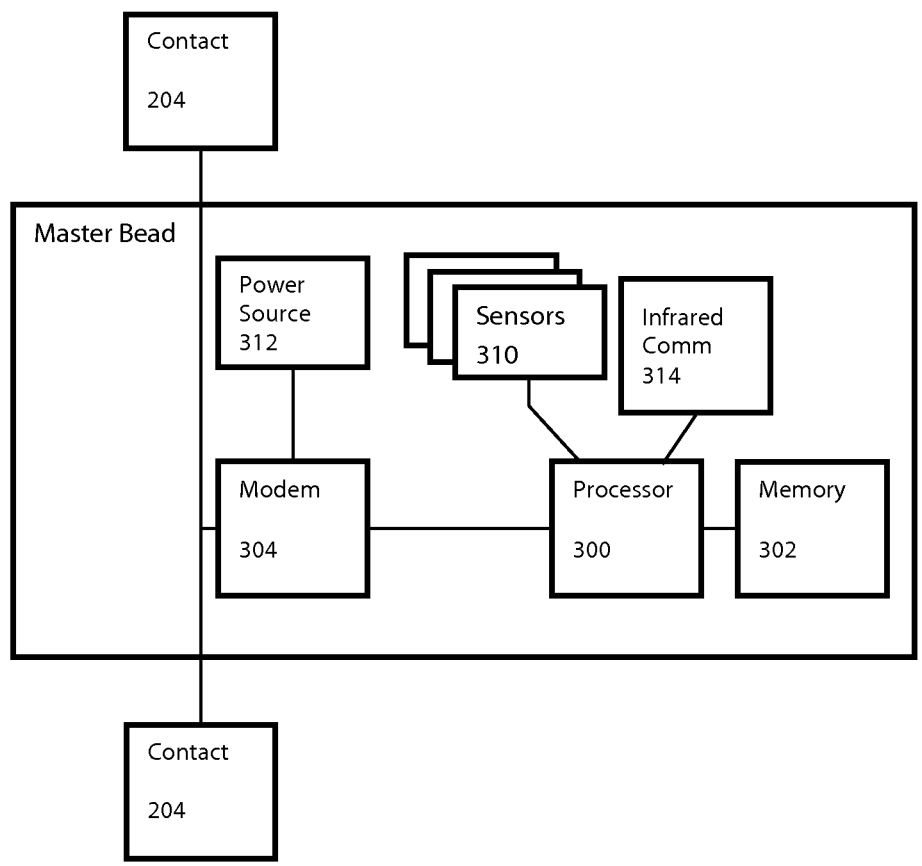
FIG. 3 is a schematic representation of an example master bead.

Referring now to FIG. 3, a master bead comprises a power source (312), such as, for example, a battery or solar cell, which is used to power the beads of the jewelry apparatus. The power source is electrically coupled to the circuitry of the master bead and is coupled to slave beads by the contacts (204) at each end of the master bead.

The circuitry of the master bead typically comprises at least a processor (300) and memory (302), the memory storing computer instructions for execution by the processor. The instructions may cause the processor to perform at least one function. The processor may be linked to a modulator/demodulator (304) which provides signals and power over the contacts (204) to other beads (not shown). In the illustrated embodiment, an infrared transceiver (314) provides transmission and reception of signals between master beads.

In respect of intra-jewelry control, the signal provided by a master bead is intended for a slave bead on the same jewelry apparatus. It will be appreciated that slave beads may thus be provided without a power source and are powered by master beads of the jewelry apparatus. Signals and current may be transmitted to and returned from adjacent beads via conduction through the contacts or via the conductive common medium, as the case may be.

Figure 4:
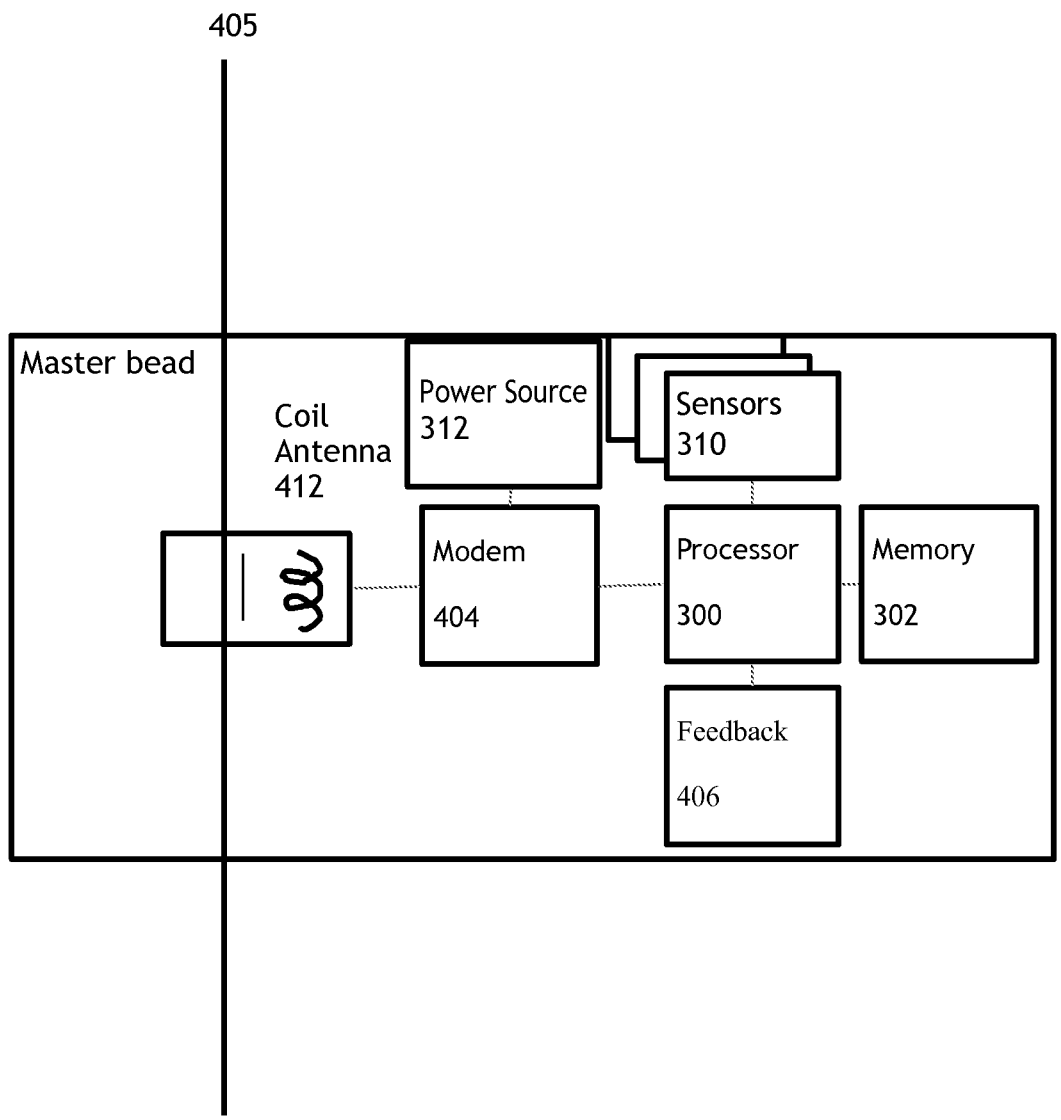
FIG. 4 is a schematic representation of another example master bead.

Referring now to FIG. 4, another master bead configuration is shown. In this embodiment, a coil antenna (412) transmits power provided by the power source (312) to the permeable medium (405). The coil varies the magnetic flux in the permeable medium (405) allowing the master bead to transmit power and signal to other beads threaded on the medium. Each bead is inductively coupled to the medium, such that corresponding slave beads also having a coil may be powered and signalled over the permeable medium. Slave beads may be constructed similarly to the master bead of FIG. 4 but omitting the power source. A feedback device (406) may provide functions such as, for example, sensory feedback to a user of the jewelry. Examples of sensory feedback include visual, auditory or haptic feedback.

The ability to exchange power over a conductive or an inductive link further enables beads to charge one another while they are being worn without requiring removing them from the wearer to plug them into a stationary power source. For both conductive and inductive links, where power and signal share a common medium, the modem (404) may be configured to control both the supply of power and the modulation of the signal to the common medium. In the inductive case, the coil antenna (412) may transmit and/or receive power from the medium to power the processor and peripherals and/or charge the power source without interrupting the processor's ability to communicate to other devices on the shared medium. This can be enabled, for example, by allocating low frequency transmission to the power and higher frequency transmission to the signal. This enables beads to operate for longer than their batteries would normally permit by drawing power from the batteries of adjacent beads. It can therefore allow the user to wear their favorite bead continuously and thereby increase the likelihood that the user remains engaged with the bead and with the system of beads. This interface could also allow for the production and sale of a "booster bead" that simply charges each other master bead on the shared medium or daisy chain until it is removed and recharged.

The processor (300) obtains signals transmitted by another bead and can respond with sensor data or by updating feedback outputs.

The feedback device (406) may comprise one or more light emitting diodes (LEDs) which the processor is configured to selectively illuminate upon receiving the preconfigured signal from the master bead. Sensory feedback may further comprise auditory feedback, vibration, varying transparency/opacity, changing color, and displaying alphanumeric information.

Master and/or slave beads may further comprise sensors (310), such as sound, motion, light or electrical sensors. Thus, slave beads may be configured to provide a function in response to a state observed by the sensors, for example in response to presence of sound, of a particular sound, of acceleration, darkness, battery status, etc. These functions need not necessarily be directed by a master bead.

With respect to inter-jewelry communication, the processor may further be linked to wireless communication circuitry to enable a plurality of master beads to communicate with one another. Communication may be accomplished by Bluetooth™, ANT, IEEE 802.11, binary phase shift keying (BPSK), or other communication protocol. Such communications may include the use of a paired smartphone to facilitate inter-jewelry communication.

However, communication may further be provided by optical communication, e.g., using visible light displayed to a camera or collected from a portion of the screen, or through infrared signals. Such optical communication preferably dispenses with any need for a relatively more powerful intermediary device, such as a smart phone.

Preferably, the communication protocol applied is one that enables addressing of communications, such that any given master bead can direct a signal to particular ones of the other master beads in proximity. Each of the master beads' memories may, therefore, have stored thereon a unique address enabling other master beads to direct signals to it. Master beads may thus communicate with other master beads to cause the other master beads to provide sensory feedback using corresponding slave beads.

Additionally, the wireless communication circuitry (314) may enable the processor to be remotely configured by a computing device, such as a smartphone, for example. In a further example, beads that provide auditory or visual feedback can be used as a wearable computing extension of the smartphone. For example, the visual feedback may be provided by LEDs which can be configured to display text information for the smartphone (e.g., called ID, weather, email, SMS, etc.) and/or the auditory feedback may be augmented with a microphone and be used as a speakerphone.

Figure 5:
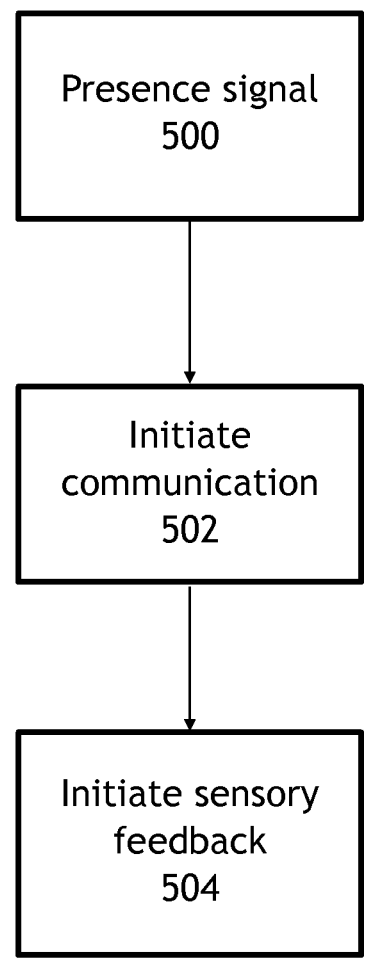
FIG. 5 is a flowchart illustrating an example of a master bead initiating sensory feedback via slave beads in response to communication with another master bead.

Referring now to FIG. 5, in an example usage of inter jewelry communication and intra-jewelry communication, a pair of users may wish that their respective apparatus of jewelry illuminate in a particular pattern when in a particular proximity of one another. Each user may configure their jewelry using a smartphone to produce a particular illumination pattern in the presence of the other jewelry apparatus.

In block 500, master beads may periodically send a beacon or presence signal announcing their presence to other master beads. In block 502, upon coming within the proximity, master beads of each jewelry apparatus receive the beacon of the other and initiate a communication to exchange address information. In block 504, each jewelry apparatus recognizes the other and initiates sensory feedback using its master beads, alerting its user of the presence of the other user.

Examples of illumination patterns include where a "sparkler" master bead turns the slave beads on and off randomly, while a "spectral chaser" master bead lights them in the sequence of the rainbow.

In a particular embodiment, inter-jewelry communication may be encrypted to mitigate privacy concerns. Master beads may perform key exchange, for example using challenge/response, as is known. Any particular master bead may be configured to only provide its address or other identifying information to authorized other master beads.

In embodiments, the jewelry apparatus may be used for hand-action games by interacting with at least one additional apparatus or a simulator. Hand-action games include clapping games, rock paper scissors, hot hands, etc. The additional apparatus could be worn by another user or the same user on another part of the user's body. Without loss of generality, the game may be played by one player; by two or more than two players; by one or more players interacting with "virtual" other player(s) via a game console or networked game consoles; by one or more players using specialized device(s) simulating, for example, hand movements of an additional player; with a remotely-located player or players via a video-telecommunications link or via mobile device.

Figure 8:
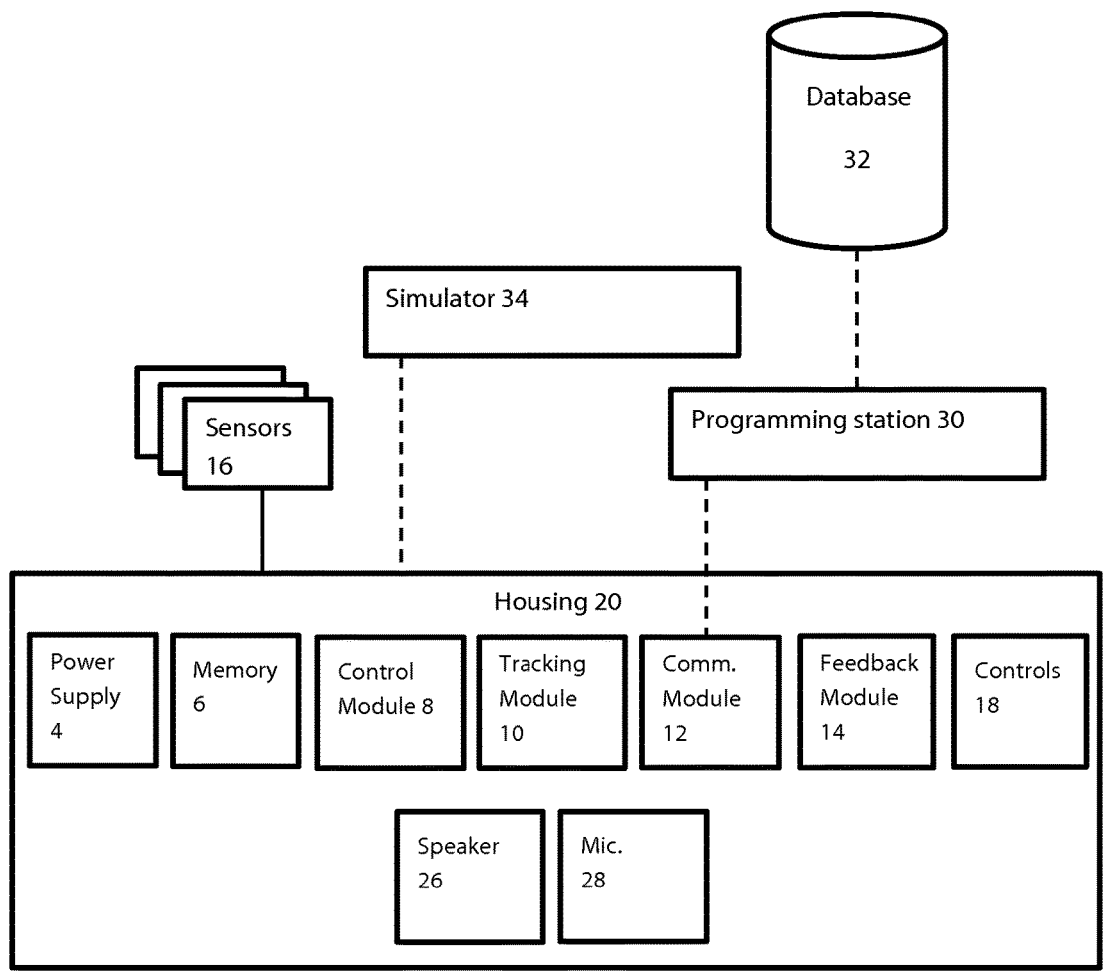
FIG. 8 is an architecture diagram of an embodiment of a jewelry apparatus.

Referring now to FIG. 8, an apparatus comprises a power supply (4), memory (6), control module (8), tracking module (10), communications module (12), feedback module (14), a plurality of sensors and one or more controls (18), such as switches, buttons or touchpads, for example. It will be appreciated that the foregoing could be provided by a master bead, a plurality of master beads, or one or more master beads in combination with one or more slave beads. In a specific embodiment, each of the control module (8), tracking module (10), communications module (12), feedback module (14), plurality of sensors and one or more controls (18) are provided by dedicated slave beads configured for such purpose.

The memory (6) stores one or more preconfigured game patterns which describe a sequence of movements required to be performed using the apparatus in order to achieve successful completion of the game. Typically, the game pattern is repeated continuously at a periodically increasing speed until a user or users are unable to complete the game pattern at a preconfigured accuracy level. A user may interchange particular slave beads having stored thereon a particular set of game patterns, such that a plurality of such beads could be modularly used to provide an indeterminate number of games.

The memory (6) also stores game parameters. Game parameters may comprise, for example, timing tolerance, accuracy tolerance and speed increase rate. The timing tolerance corresponds to the thresholds of how early or late a user may perform a step of the game pattern as measured against the ideal (preconfigured) timing. The accuracy tolerance corresponds to a threshold, such as number or percentage of steps, or number or percentage of consecutive steps, a user is permitted to incorrectly perform the game pattern without triggering a failure. The speed increase rate corresponds to an increase in the speed at which the game pattern must be performed. Typically, the speed will be increased each time the user successfully completes (that is, within the timing tolerance and accuracy tolerance) the game pattern.

The memory (6) further stores the address of the apparatus and of each other apparatus with which it is being used. Again, the address may be provided on a slave bead which could be interchanged.

The control module may perform an addressing process to resolve addresses. For example, each apparatus may have an initial address of 0, or any other arbitrary address. Upon the commencement of gameplay, which may be triggered by the user performing a predetermined pattern using the apparatus or by activating a control (18), each apparatus in a particular proximity may communicate with each other to allocate addresses. Each apparatus may store in its memory (6) the address of each other apparatus it locates for which the other apparatus's address is not the same as its own and not the same as another apparatus already located. If the other apparatus's address is the same as its own, it may change its address to the least recently observed address among valid addresses. The control module (8) may then repeat the foregoing addressing procedure.

In a particular example, each apparatus has a 2-bit address, which enables up to 4 apparatuses to be used in a game. The 4 apparatuses, in this case, may be for two users each wearing an apparatus on their left and right hands. Increased address size may be provided to enable additional apparatuses to be used.

The tracking module (10) implements a tracking process which determines the movements and interactions of the apparatus and compares these movements and interactions to the preconfigured game patterns, which the tracking module (10) obtains from the memory (6), to determine whether a user is successfully performing the ordered movements within the preconfigured timing tolerance and accuracy tolerance, which the tracking module (10) obtains from the memory (6). The interactions and movements are determined based on signals received from the sensors.

The sensors preferably enable the tracking module (10) to determine acceleration, rotation orientation, pressure, bending and/or velocity of the apparatus and to determine if and when contact is made between particular portions of the apparatus and portions of each other apparatus. The sensors may be provided by a plurality of slave beads.

The sensors may comprise an accelerometer and three-axis gyroscope for determining angular acceleration of the apparatus on each of the X, Y and Z axes. The gyroscope also enables the tracking module (10) to determine orientation of the apparatus (i.e., vertical, horizontal palm-side-up, horizontal palm-side-down or any vector combination thereof).

Pressure and velocity may be determined based on acceleration information provided by the accelerometer. Pressure may be determined based on acceleration being above a certain preconfigured threshold (or varying beyond a certain rate). Additionally, or alternatively, pressure may be determined by a piezoelectric material integrated into the apparatus that provides a direct voltage differential when deformed. Velocity may be determined from the acceleration during a contact event.

To localize the portions of the apparatus that are in proximity with another object, such as another apparatus, the tracking module (10) interacts with the communication module described above, e.g. utilizing infrared. The use of infrared, in particular, enables reliable tracking of proximity as the strength of a received infrared signal is correlated with proximity.

The tracking module (10) then determines which other apparatus, if any, it has come in proximity with. This may be determined by, for example, querying the apparatus addresses to determine which apparatus is closest in proximity. The other apparatus makes similar determinations. The two apparatuses may then communicate to exchange the information for validation. Alternatively, the determination of which other apparatus is in contact can be made by allocating a different electrical characteristic, such as a resistance-based identifier, to each apparatus, in which case the sensing apparatus can determine which other apparatus it is contacting without further exchange of information. Yet another alternative is to determine based on probabilities which apparatuses are in contact. For example, if exactly two apparatuses indicate contact at the approximately the same time, it is likely the two apparatuses made contact with each other.

In one example, the touch sensors comprise an accelerometer and proximity sensor pair. The accelerometer indicating fast movement followed by a sudden deceleration indicates the user has made contact with an object. Meanwhile, the proximity sensor determines the other object with which contact has been made. The proximity sensor may be implemented by the use of an RGB LED flashing a predetermined pattern before a "hit" and a color sensor (on another apparatus) detecting the projected light pattern. Each apparatus can be configured to display unique patterns, thus enabling each apparatus to determine with which other apparatus contact has been made. The flashing patterns may also be used to transmit apparatus addresses as described above.

The tracking module (10) may be used to depower, or put into a standby mode, the apparatuses. For example, if the touch sensors and/or accelerometer and/or gyroscope have not measured any change or event above a predetermined tolerance, the tracking module (10) may conclude the apparatus is not being used and can depower the apparatus. In this way, it is possible for a slave bead to direct whether the master bead should provide a constant power stream to the apparatus.

The communications module (12) enables communication between apparatuses and between the apparatus and a programming station (30). The programming station (30) may, for example, be a personal computer, tablet, smart phone or other consumer electronic device. A user can configure the memory (6) using the programming station (30), for example to add, delete, modify or configure game patterns and game parameters.

Each apparatus may further comprise a feedback module (14) linked to one or more feedback devices. Feedback devices may comprise a speaker, light-emitting device (including LEDs and electroluminescent piping) and/or haptic device.

It will be understood that the feedback provided for each of the foregoing events is preferably different from one another. For example, a distinct sound, or lighting pattern, for example, may be provided for each event.

Feedback may also be used to assist a user in configuring the apparatus. For example, the apparatuses may be preconfigured with more than one game, selectable by a control (18), or by swapping slave beads having different games stored thereon. The feedback module (14) may be used in connection with the control (18) to visually or aurally represent to the user which game is being selected. Alternatively, a game may be selectable by the user successfully completing a preconfigured number of steps of one of the game patterns, such that the apparatus senses which game is being played.

In a further aspect, the communications module (12) may be used to enable a programming station (30) to remotely access and configure the memory (6). For example, a user may use a programming station (30) and suitable software, such as a web portal interface, to configure new game patterns, upload game patterns to the apparatus, modify the game parameters, modify the feedback sounds or light patterns, configure background music to be played during game play rather than or in addition to feedback sounds, etc.

A publicly available database (32), such as one hosted on a website, may also be provided as a repository for game patterns that can be downloaded by other users and upload the game patterns to the apparatus's memory (6). Game patterns may also be provided to an apparatus from another apparatus, for example using wireless or wired communication.

Furthermore, one apparatus may be used with an apparatus simulator (34). The apparatus simulator (34) may, for example, be a touch-sensitive board upon which an image of a right and left hand are shown. The board simulates another user's apparatuses and communicates the playing user's apparatus. The touch-sensitive board may be provided using a tablet computer, for example.

Figure 9:
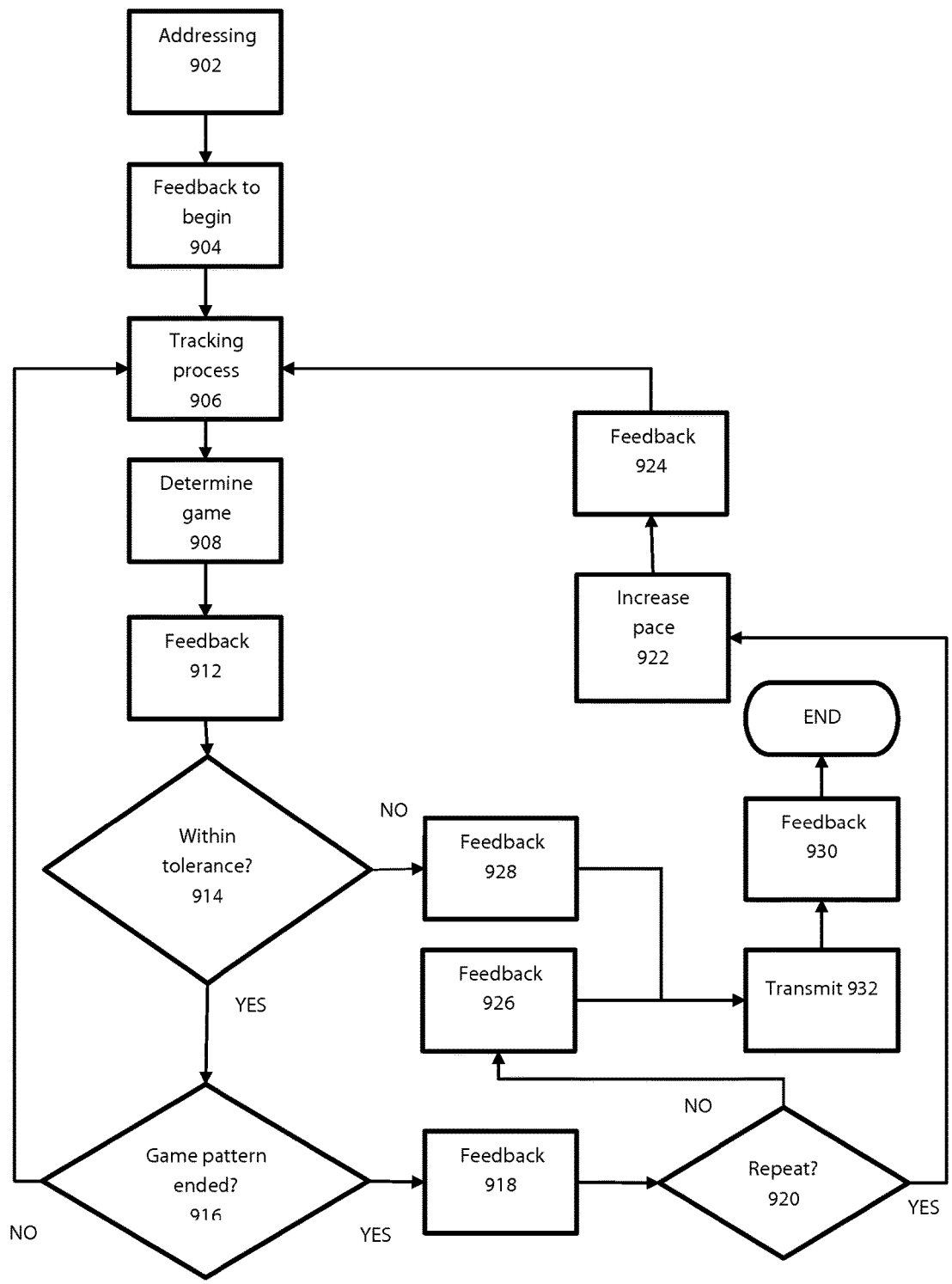
FIG. 9 is a flowchart for using the jewelry apparatus for game play.

Referring now to FIG. 9, in an example use, two users may each be wearing two apparatuses. Upon activating the apparatuses, the control modules perform the addressing process (902) to allocate an address to each apparatus. The apparatuses may provide feedback indicating that the users are to begin performing the game pattern of their choice (904). The users decide upon a game to be played and begin performing the game pattern by contacting pairs of apparatuses together. The tracking module of each apparatus performs a tracking process to determine which portion of that apparatus is in closest proximity to other objects and subsequently determines which, if any, other apparatus it is in proximity with (906). This determination provides each tracking module with the information necessary to determine which, if any, game pattern is being played.

Each apparatus will obtain a different set of sensor data and may make decisions independently as to whether it is playing a particular game. These decisions may be broadcast to other apparatuses using a communication link so that they are each able to start to play the same game at the same time. In the event of a conflict, a measurement of the confidence of each apparatus may be used to mediate the conflict. This same measurement of confidence could be used to trigger a determination that a particular game is being played, for example by comparing it with the confidence measures for other games or even other parts of the same game. This measure may be based on the degree of correlation between the observed events and the expected events within a particular game. By checking events against different parts of a game, the apparatuses could in effect clue in, even some time into the game, to allow them to give feedback even on a relatively poor performance or a game or a game that starts with relatively subtle motions.

The apparatuses determine which game pattern is being played and the current pace of play (908). During game play, the tracking modules compare the performed game patterns with those that are preconfigured in the memories (910) and determine whether the performed game patterns are being performed within the tolerances of each apparatus (914). Also during game play, the feedback module provides suitable aural and/or visual feedback to the users (912).

At the end of the game pattern (916), the feedback module may provide feedback indicating success (918). If the game pattern is to be repeated (920), the apparatuses increase the pace of play (922) using the speed increase rate, which will be reflected in the comparison of the performed game patterns with those that are preconfigured. To provide the users with a sense of the pace of play, the feedback module may provide suitable feedback (924), such as correspondingly increasing the pace of feedback (i.e., increased pace of musical feedback).

Alternatively, information obtained during gameplay can be used to increase the pace of play. If, during the performance of the game pattern, the apparatus sensed that the player strongly desires a fast beat, for example by sensing a strong peak acceleration before the beat, the apparatus may determine that the increase in pace of play should be greater than the speed increase rate, while sensing a strong peak acceleration after the beat will signal to the apparatuses the players strongly desire a slower beat and the pace of play should be increased less than the speed increase rate, or even reduced.

If the game pattern is not to be repeated but the game pattern was performed successfully (i.e., within the preconfigured tolerances), the feedback module may provide feedback indicating success (926). If at any time the game pattern is not being performed successfully, the feedback module may provide feedback indicating failure (928).

Following completion of game play, whether by success, failure or simply the users ceasing to perform the game pattern, the feedback module may provide feedback of performance (930). Alternatively, the communications module may transmit performance statistics to an external device (932), such as a smartphone, to be displayed graphically.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A wearable electronic apparatus configured to be disposed on an individual, comprising:
    at least one slave unit and at least one master unit, the at least one master unit configured to communicate with the at least one slave unit to cause the at least one slave unit to perform at least one sensory feedback function; and
    an electrically conductive medium on which the at least one slave unit and the at least one master unit are disposed, wherein the at least one master unit communicates with the at least one slave unit via the electrically conductive medium, and wherein the electrically conductive medium supports the wearable apparatus on the individual.

2. The wearable electronic apparatus of claim 1, wherein the at least one master unit is further configured to communicate directly with at least one master unit of another wearable electronic apparatus worn by another individual.

3. The wearable electronic apparatus of claim 1, wherein the medium is magnetically permeable and at least one master unit communicates with the at least one slave unit via signals transmitted along the medium.

4. The wearable electronic apparatus of claim 1, wherein each slave unit is coupled to an adjacent slave unit via a coupling, and the at least one master unit communicates with the at least one slave unit by the at least one coupling.

5. The wearable electronic apparatus of claim 4, wherein the at least one coupling comprises a female connector of one unit configured to removably receive therein a corresponding male connector of the adjacent unit.

6. The wearable electronic apparatus of claim 5, wherein the female connector of each unit is conductive and the corresponding male connector of the at least one adjacent unit is conductive such that the female connector and the corresponding male connector are configured to transmit by conduction therebetween an electric signal, and the at least one master unit communicates with the at least one slave unit via the electric signal.

7. The wearable electronic apparatus of claim 1, wherein the at least one sensory feedback function comprises at least one of visual, auditory and haptic feedback.

8. A kit for a wearable electronic apparatus configured to be disposed on an individual, the kit comprising:
    a plurality of master units;
    a plurality of slave units; and
    an electrically conductive medium;
    wherein the wearable electronic apparatus includes at least one slave unit selected from the plurality of slave units and at least one master unit selected from the plurality of master units, the at least one master unit configured to communicate with the at least one slave unit to cause the at least one slave unit to perform at least one sensory feedback function;
    wherein the at least one slave unit and the at least one master unit are disposed on the electrically conductive medium and the at least one master unit communicates with the at least one slave unit via the electrically conductive medium; and
    wherein the electrically conductive medium is configured to support the wearable apparatus on the individual.

9. The kit of claim 8, wherein the at least one master unit is further operable to communicate directly with at least one master unit of another wearable electronic apparatus worn by another individual.

10. The kit of claim 8, wherein the at least one sensory feedback function comprises at least one of visual, auditory and haptic feedback.

11. A wearable electronic apparatus comprising a plurality of units disposed in series on a medium, said units comprising at least one master unit and at least one slave unit, the at least one master unit configured to communicate with and power the at least one slave unit to cause the at least one slave unit to perform one function to provide sensory feedback.

12. The wearable electronic apparatus of claim 11, wherein the at least one master unit communicates with the at least one slave unit using the medium or directly.

13. The wearable electronic apparatus of claim 11, wherein the sensory feedback comprises at least one of visual, auditory and haptic feedback.

14. The wearable electronic apparatus of claim 11, wherein the sensory feedback comprises visual feedback and the visual feedback is provided by light emitting diodes in the slave units.

15. The wearable electronic apparatus of claim 11, wherein the at least one master unit communicates with and powers the at least one slave unit via the medium.

16. The wearable electronic apparatus of claim 15, wherein the medium is formed of a magnetically permeable material in a closed loop.

17. The wearable electronic apparatus of claim 16, wherein the at least one master unit and the at least one slave unit each include a coil, and wherein the at least one master unit inductively transmits power and communication signals via its coil to the medium and the at least one slave unit receives the power and communication signals from the medium via its coil.

18. The wearable electronic apparatus of claim 15 wherein the at least one master unit is further configured to communicate directly with a corresponding master unit of another wearable electronic apparatus worn by another individual.

* * * * *